Dec. 8, 1959     J. W. BOWMAN     2,915,957
APPARATUS FOR MAKING FOOD PRODUCTS
Filed Nov. 30, 1956
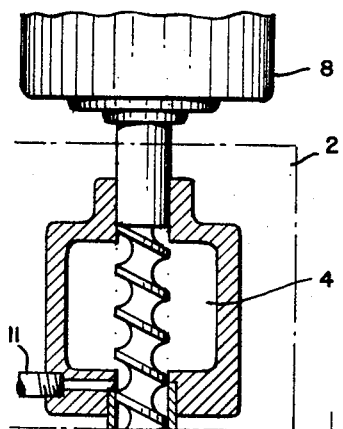
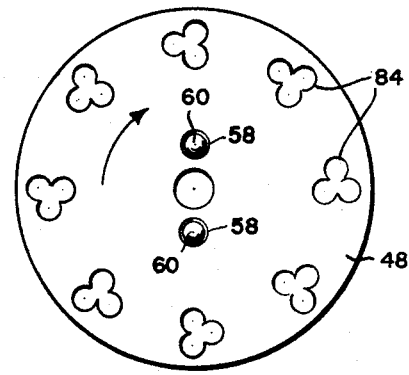
FIG. 4.
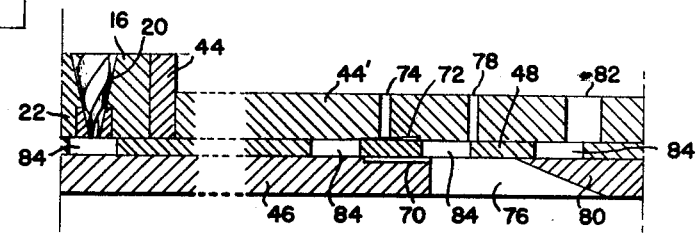
FIG. 6.
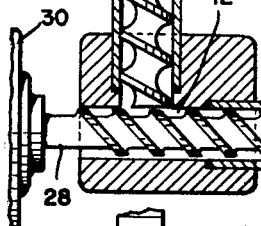
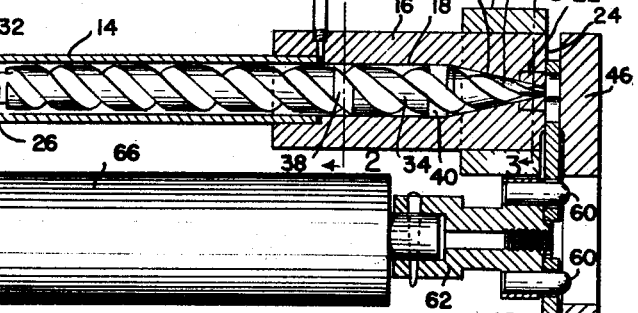
FIG. 1.
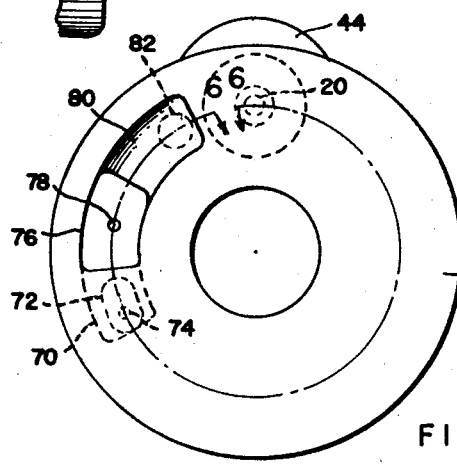
FIG. 5.
FIG. 2.
FIG. 3.
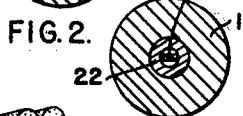
FIG. 7.
INVENTOR.
JACOB WARREN BOWMAN
BY
ATTORNEYS

United States Patent Office 2,915,957
Patented Dec. 8, 1959

2,915,957

APPARATUS FOR MAKING FOOD PRODUCTS

Jacob Warren Bowman, St. Petersburg, Fla.

Application November 30, 1956, Serial No. 625,504

5 Claims. (Cl. 99—238)

This invention relates to food products and methods and apparatus for making the same and has particular reference to shaped food products made by the explosive expansion of steam in a cereal meal composition.

Products made by the expansion of steam in cereal compositions have a wide market at the present time, and among these are snacks prepared generally from corn meal and having various flavors such as cheese flavors. These products are generally in the form of "curls" or irregular flakes produced by the extrusion of a cereal meal composition which has been subjected to high temperatures under high pressures and permitted to escape into the air whereupon steam therein expands producing porous products. Very little control of shape of the products is possible, it being usual to permit them to be formed as broken ropes of the final material. The exploded products are completed for marketing by baking and then given suitable treatments as with salt, flavoring matters, or the like.

It is one object of the present invention to provide products of this same general character but with certain marked differences. One of the objects is to provide products which have well-defined shapes, such as those of the suits of playing cards, rectangular or other blocks, discs, or even more elaborate shapes.

Secondly, one of the objects of the invention is to provide such products which have controlled physical characteristics. For example, in the curl products referred to above, the voids or pores are extremely non-uniform throughout the individual curls. This is apparent not only on examination but on biting and, in particular, there is sensed a certain degree of toughness, particularly after the products have been exposed even for a short time to the atmosphere. In accordance with the present invention the products may be given a wide variety of different physical characteristics. On the one hand, the individual pores may be comparatively minute and exhibit a substantial degree of uniformity of distribution though, of course, they do vary in size. The characteristics are best appreciated when the products are bitten. They then have considerable resemblance to conventional crackers. The apparent specific gravity is substantially lower than that of the curl products. On the other hand, the products may have relatively large pores with increase of apparent specific gravity.

A further object of the invention is the provision of the methods and apparatus for producing the aforementioned improved products. Briefly stated, the invention involves a screw feeding mechanism which by the production of friction raises a meal of the cereal used to a quite high temperature and at the same time produces very high pressure so that the aqueous content of the meal is either held in liquid condition or the steam is very highly compressed. Intermittently this region of high pressure and temperature is opened to shaped pockets wherein metered quantities of the mixture are delivered. The pockets represent low pressure zones and the meal mixture explosively expands therein filling the same and giving rise to a definite quantity of material filling the shaped space. The space then remains closed for a substantial interval during which it appears that a stabilizing action occurs with the escape of steam to lower the pressure. The individual pieces of the product are then ejected from the shaped spaces and have then the properties above indicated.

The foregoing and other objects of the invention relating in particular, to details of apparatus construction and method steps will become apparent from the following description, read in conjunction with the accompanying drawings, in which:

Figure 1 is a sectional view showing a form of apparatus particularly adapted to carry out the invention;

Figure 2 is a section taken on the plane indicated at 2—2 in Figure 1;

Figure 3 is a fragmentary section taken on the plane indicated at 3—3 in Figure 1;

Figure 4 is an elevation showing, particularly, a plate having shaped openings therein;

Figure 5 is an elevation of a cover plate showing in dotted lines certain other elements of the apparatus cooperating therewith;

Figure 6 is a sectional development taken on the cylindrical surface indicated at 6—6 in Figure 5; and Figure 7 is a view showing the product of the apparatus and method.

As will become evident, a large variety of cereals may be used in the practice of the invention, and these, depending upon their individual properties (e.g. moisture content, starch content, specific gravity) may require the use of varying conditions for the optimum operation of the method. To furnish a clear example of the invention reference will be hereafter confined in the description of the operation to the use of corn meal. The method and apparatus may be used, in fact, for the processing of other than cereal products, for example using as the material treated compositions containing starch (potatoes, tapioca, etc.) fish or other sea food, meat, and other cellular edible mixtures. Specifically, potato chips or waffle potatoes, or the like may be produced using comminuted potatoes.

The corn meal in dry condition (having, for example, an inherent moisture content 8 to 10%), or with additional water added thereto, is supplied to a hopper indicated at 2 which delivers it to a chamber 4 from which it is fed through a tube indicated at 10 by means of a screw 6 driven by a motor 8. The screw 6 serves only as a conveyor and takes no appreciable part in raising the temperature of the meal or otherwise affecting the results. In accordance with the present method it is desirable to admix water with the meal and this may be accomplished by feeding water in measured quantity through a connection 11 to the meal as it leaves the chamber 4 under the action of the conveyor screw. Typically, assuming an inherent moisture content in the meal as indicated above, the water may be added at the rate of four to seven quarts per hundred pounds of the meal. This water addition may be made up by premixing water with the meal, premixing part of the water with the meal and adding the remainder at 11, or by adding the entire quantity at 11. The second procedure is preferred, the amount added at 11 being in minor amount. Any feed of water is accomplished by the use of an adjustable delivery pump for the water operated by the motor 8 which drives the screw. As will shortly appear, three motors are indicated as driving the various moving parts of the apparatus. These motors may be of adjustable speed types so that their speeds may be individually regulated relative to each other, or, alternatively, fixed speed motors or a single motor may be used to drive the various shafts through adjustable speed devices of well known types.

The tube 10 through which the corn meal is fed opens into a chamber 12 from which a tube 14 extends into a housing 16, the housing having a cylindrical bore portion 18 having the diameter of the bore in the tube 14, the cylindrical bore portion being followed by a conical converging bore 20 which is continued by the further converging conical bore of a hardened insert 22. The face of the member 16 is indicated at 24, and the face of the insert 22 is short by 0.001–0.002 inch of the face 24 to afford a clearance which is desirable as hereafter pointed out.

Extending from the chamber 12 through the bore of the tube 14 and also through the cylindrical and tapered bores indicated there is a composite screw 26 the shaft 28 of which forms a continuation thereof, being driven by a motor 30. This screw 26 typically operates at a high speed, for example, at thirty-six hundred revolutions per minute, a typical motor which is used with a tube 14 having an internal diameter of 1¼ inches developing twenty horse power. The power of the motor is particularly mentioned since it is indicative of the energy which in the apparatus is transformed into heat and pressure energy in the material undergoing treatment. High speed of screw rotation is particularly effective in securing best results.

The left-hand portion of the screw 26 indicated at 32, is desirably of two-thread type, which, in a 1.25 inch bore, may typically have a lead of about 0.652 inch (a pitch of 0.326 inch). The grooves between threads are shallow. For example, for the dimensions given, the depth of the groove may be about 0.130 inch, the threads having small axial dimensions. For a 1.25 inch bore of tube 14, the outside diameter of the screw portion 32 may be about 1.220 inch, there being thus provided a diametral clearance of about 0.03 inch.

At its right-hand end the screw 26 has an entirely different form. Here also there is involved a double thread screw which has a constant pitch through the cylindrical and conical portions thereof. The pitch may typically be 1.75 inch. The form of the screw found most desirable is illustrated by the sections in Figures 2 and 3 wherein it will be noted that the screw is actually formed by milling the flats 42 and 42', the former in the cylindrical portion and the latter in the tapered portion. The included angle of the taper of the thread trough may be typically about 17° 50' while the external taper and the internal taper of the bore 20 may have an included angle of about 23°. As will therefore be evident, both because of this and the decreasing diameter of the conical bore, considering the constant pitch, there will be involved in the conical region a decrease of volume of space for the material being fed resulting in the maintenance or increase of high pressure, the material being required to slip relative to the screw threads in view of this. Reference was just made to the maintenance of pressure since actually a considerable pressure is built up by the action of the threaded portion 32 of the screw preceding the threaded portion 34 thereof.

It is also possible to have the entire length of the cylindrical portion of the screw threaded as at 34, without having the preliminary portion threaded as at 26. The screw 6 may also be omitted, the screw 34 receiving the meal directly from a hopper.

Except as will be immediately noted, the cylindrical and tapered screw portions 34 and 36 have substantial clearance with the bore portions in which they rotate, this clearance being approximately one-sixteenth inch on the diameter except at the extreme tip of the screw where the clearance drops to the order of 0.001 to 0.002 inch. While the screw is maintained approximately centrally by the material which it is advancing, it is desirable to furnish centering by providing through limited regions indicated at 38 and 40 relatively close running clearances of the order of a few thousandths of an inch, the outside diameter of the screw blank prior to milling of the threads being here locally of a corresponding larger diameter. Pads accordingly appear on the tops of the threads at 90° intervals.

Just beyond the right-hand end of the tube 14 there is provided a passage for the introduction of oil from the pipe 37. The oil here introduced is a cooking oil such as peanut oil, corn oil, or the like, which typically may be supplied at a metered rate of about four quarts per hundred pounds of meal, the oil pump being driven from the motor 8. This oil is desirable not only for the attainment of the most desirable product but for the lubrication in the region to the right of its point of entry, particularly the lubrication of disc 48. As indicated above, the compressed and heated meal here slips relative to the threads and the lubrication permits the slippage which is primarily along the trough faces 42 and 42' of the screw and through the orifice.

The member 16 is secured in a portion 44 of the machine frame, an extension of which is indicated at 44'. (It will be understood that the machine frame comprises conventional beams and connecting elements which need not be shown in detail herein.)

An end cover plate 46 is secured to the frame member 44—44' in such fashion as to provide a running space for a disc 48 shown particularly in Figure 4. In order to provide a definite running space, clamp elements 50 are disposed about the periphery of the plate 46 and are shaped as illustrated in Figure 1, being secured to the frame portion 44' by screws 52 passing through slots 54, there being provided adjusting screws 56 whereby the running clearance may be accurately set. This running clearance is of the order of 0.001 inch and such clearance is desirable rather than undesirable for reasons which will be hereafter pointed out. In order to secure smooth running the disc 48 is provided with a pair of openings 58 slightly larger than pins 60 projecting from a coupling element 62 which is secured to a shaft 64 mounted in bearings within a cylindrical member 66 and arranged to be driven from a motor 68 incorporating reduction gearing to secure a proper rate of rotation of the disc 48.

The cover plate 46 is held against rotation with the disc 48 by the provision of shoulders 51 engageable with the clamps 50, the arrangement being such that the disc 46 may be reversely rotated for release from the clamps for cleaning purposes.

The frame member 44 and cover plate 46 may be water jacketed or finned for cooling by water or air to prevent overheating.

Reference may now be made particularly to Figures 5 and 6 to illustrate the relationship between the frame portions 44—44' and the plate 46. In the region indicated at 70 the plate 46 is slightly undercut in bevelled fashion with the maximum undercut of the order of 0.10 inch. Opposite to this the frame 44' is also undercut as indicated at 72 to the extent of about 0.08 inch, and this undercut communicates through an opening 74 with a supply of compressed air. Beyond the undercut 70 in the direction of rotation the plate 46 is provided with an opening 76 opposite the central portion of which there is the passage 78 in the frame portion 44' for the introduction of a second blast of compressed air from the compressed air supply.

Beyond the opening 76 the exterior surface of the plate 46 is bevelled from a knife edge to insure outward removal of the pieces of products. Opposite this taper there is an enlarged opening 82 in the frame member 44 to which connections are provided to a vacuum pump for removal of air.

The plate 46 opposite the opening of the tapered bore 20 is closed.

The disc 48, shown in Figure 4, is provided with evenly spaced shaped openings 84, which is illustrated in the figure are in the shape of "clubs." All of these openings may be of the same shape, though if a mixed product is desired there may be various shaped openings in the same plate in which latter case the openings should have approximately the same volume to insure uniformity of characteristics of the products. The plates 48 are readily replaceable so that plates with suitably shaped openings of various types may be located successively in the apparatus for the purpose of producing different products. The shaped openings 84 revolve in the path which corresponds to the cylindrical trace 6—6 in Figure 5, the depression 70, the opening 76, and the tapered undercut in the plate 46 having radial dimensions exceeding the maximum dimensions of the openings 84.

The openings 84 indicated in Figures 4 and 6 are of constant cross-section through the thickness of disc 48, but this is not necessarily the case since they may be of semi-convex shape with openings to the feed passage smaller than their openings to the discharge side of the disc. The shape must, of course, be such that ejection may occur. As examples, the openings may be shaped to provide products in the form of half peanuts or almonds, wafers convex or concave on one side, etc.

It will be noted that the angular spacing in the direction of rotation (clockwise in Figure 5) between the bore opening 20 and the location of the depression 70 is approximately three quarters of a circumference. This provides an extended region in which the openings 84 in the disc 48 are maintained closed, the speed of operation being desirably such that the time of maintenance of such closure is of the order of 0.10 to 0.20 seconds. As will be pointed out, this provides for a stabilizing action involving substantial drop of pressure due to the escape of steam through the slight clearance between the disc 48 and the frame portion 44—44' and the end plate 46.

The operation is as follows:

In the operation of the apparatus the corn meal, preferably mixed with the major amount of the water to be added is fed into the hopper 2 and after addition of water through the connection 11 as above mentioned it is fed to the chamber 12 by the screw 6. The screw 6 acts only as a conveyor and does not affect the physical nature of the corn meal mixture.

From the chamber 12 the meal is picked up by the screw 26 and thereby it is subjected to intense friction and is compressed during its advance, the screw is previously mentioned operating at a high rotational speed such as 3600 revolutions per minute. The screw thread clearance mentioned above probably provides slippage which has a substantial part in the production of friction which raises the temperature so that in the vicinity of the second screw portion 34 metal temperatures are attained which are of the order of 400° to 500° F. Pressures appear at the location of the oil-introducing pipe 37 of the order of 500 to 600 pounds per square inch. Under these conditions the corn meal is completely transformed into a plastic mass which is fluent at the temperatures involved but which, if cooling is permitted with reduction of pressure, has the form of a brittle compact mass resembling a hard resin. As progress takes place through the cylindrical and then the conical portions of screw 34 the available volume for the material, on an assumption of continuous advance, progressively decreases with the result that there occurs slippage relative to the screw, the slippage being permitted by virtue of the surfaces 42 and 42' which are flat in cross-section as shown in Figures 2 and 3. As will appear, the delivery of the material from the screw is intermittent and because of this such slippage must occur.

The disc 48 is continuously rotated and apparently what occurs is the following, which may be particularly made clear from consideration of the developed section constituting Figure 6.

When one of the openings 84 opens to the screw chamber, a measured quantity of the composition enters the opening, the quantity being dependent upon the extent of feed accomplished by the screw in the period between opening and closing. This controls the weight of material which is introduced into the opening 84, and this may be varied for different size openings and different materials by control of the rates of rotation of the screw and disc. As will be pointed out it may be desirable, though not necessary, that the opening 84 before the introduction of the material be partially evacuated. Assuming that it is, an explosive action occurs which puffs the quantity of material introduced into the opening 84 to produce complete volumetric filling of the opening. If evacuation did not occur this same action takes places but with some cushioning and volume reduction effect due to the residual air in the opening 84, which air requires compression. However, the air escapes with sufficient rapidity that under various observed conditions of operation it is questionable whether the evacuation serves any substantial purpose. As the filled opening 84 becomes again closed by passing the feed opening, a stabilizing action takes place. This occurs during the approximate three-quarters of a revolution before the next event in the cycle. It is found that if the opening 84 is again opened too soon after filling, some further expansion of the material takes place such as would destroy the precise shape desired and also productive of irregular pores of large size. But if there is involved the length of path indicated with a time involved of the order of not less than 0.10 to 0.20 second the stabilization occurs with the result that opening will not result in further change of shape. This is probably due to the fact that because of the slight running clearance of the plate 48 with its bounding walls there is sufficient escape of steam (and air if present) to lower the pressure to such an extent that further shape-damaging expansion will not occur. Thus at the time the opening containing the expanded material reaches the location at 70 there is a stable, finally shaped product completely filling the opening 84 with a flat face corresponding to the outer face bounding the disc 48 and with either an inner flat face or a face of other shape determined by the shape of the disc opening. With running clearances of this disc limited to 0.001 to 0.004 inch no noticeable "flash" is apparent in the product.

At the location of the undercuts 70 and 72 the shaped product is dislodged from the walls of the opening 84 by the compressed air introduced at 74, and then as there is reached the opening 76 a blast of air from the opening 78 dislodges the product to project it into a suitable receptacle outside the opening 76. The wedge at 80 is provided to prevent jamming in the event that the product might not be completely discharged, the wedge either aiding the discharge or cutting off that portion of the product which projects from the outer surface of the disc 48.

As the now empty opening 84 progresses beyond the wedge at 80 it is again completely closed off and is then brought into alignment with the evacuating opening 82 to provide a partial vacuum in the opening 84. This is again closed off until it is opened to the screw discharge.

Evacuation at the opening 82 is desirable but not entirely necessary since the running clearance of the disc 48 affords escape of air so that, in general, the puffed material will still completely fill the opening 84.

The nature of the pores which are produced in the product is probably due to the fact that the expansion of steam while initially of an explosive nature is limited, the escape of steam then occurring relatively slowly under the control of the running clearance of the disc 48. Thus the steam cannot produce large voids and a rather uniform porosity is the result though the pores may be small or large. The pore size depends upon the various operating factors such as rate of feed, water content, ratio of cavity size to feed, etc.

The products thus produced may be completed for marketing by baking and treating them with flavoring materials, salt, or the like, before or after baking.

What is claimed is:

1. Apparatus for producing an edible product comprising a rotary member providing a series of cyclically moving cavities, means comprising a tapered screw for subjecting a water-containing mass to high temperature and compression and for effecting introduction successively into each cavity of a predetermined charge of the heated and compressed mass having a volume while under compression substantially less than that of the cavity, means for introducing an edible oil into the mass being advanced by said screw, means maintaining each cavity substantially closed for a substantial interval of time following said introduction of a charge thereinto, and means effecting opening of each of said cavities and discharge of the expanded charges therefrom.

2. Apparatus for producing an edible product comprising means providing a moving cavity, means comprising a screw having a tapered portion and an enclosing housing for said screw for subjecting a water-containing mass to high temperature and compression and for effecting introduction into the cavity of a predetermined charge of the heated and compressed mass having a volume while under compression substantially less than that of the cavity, means maintaining said cavity substantially closed for a substantial interval of time following said introduction of a charge thereinto, and means effecting opening of said cavity and discharge of the expanded charge therefrom, said screw having the small end of its tapered portion extending substantially to a boundary of said moving cavity.

3. Apparatus according to claim 2 in which said screw has a substantially constant pitch throughout its tapered portion.

4. Apparatus according to claim 2 in which the tapered portion of the screw has a cross-section of which the trough-forming portions are chordal.

5. Apparatus according to claim 2 in which the included angle of the trough of the thread of the tapered portion of the screw is substantially less than the exterior cone angle of the tapered portion of the screw.

References Cited in the file of this patent

UNITED STATES PATENTS

| | | |
|---|---|---|
| 874,279 | Anderson | Dec. 17, 1907 |
| 1,338,120 | Brundage | Apr. 27, 1920 |
| 1,924,827 | Anderson | Aug. 29, 1933 |
| 2,295,868 | Schwebke et al. | Sept. 15, 1942 |
| 2,350,643 | Schwebke et al. | June 6, 1944 |
| 2,668,985 | Babbitt | Feb. 16, 1954 |
| 2,765,490 | Zona | Oct. 9, 1956 |
| 2,798,253 | Rhodes | July 9, 1957 |
| 2,842,072 | Graves | July 8, 1958 |